United States Patent Office 3,751,515
Patented Aug. 7, 1973

3,751,515
HYDROGENATION PROCESS
Mario D. Zadra, Barberton, Ohio, assignor to The Goodyear Tire & Rubber Company, Akron, Ohio
No Drawing. Filed Mar. 28, 1972, Ser. No. 238,960
Int. Cl. C07c 5/04, 5/06
U.S. Cl. 260—683.9                                8 Claims

ABSTRACT OF THE DISCLOSURE

There is disclosed a method for the hydrogenation of monoolefins, cycloolefins, diolefins, cyclodiolefins and acetylenes which are hydrogenated when passed with hydrogen over a catalyst comprising an alkali metal dispersed on an anhydrous support, said catalyst having a surface area of at least one square meter per gram at temperatures ranging from about 80° C. to about 500° C.

This invention relates to the new use of a catalyst for the hydrogenation of hydrocarbons. Specifically, it relates to the hydrogenation of olefins, cycloolefins, diolefins, cyclodiolefins and acetylenes. It also relates to a novel process of hydrogenation, utilizing the catalyst.

Sodium, sodium hydride, sodium-potassium alloy, calcium and lithium have been reported to function as reducing agents in hydrogenation processes. However, most of the hydrocarbons reduced have been polynuclear aromatics or hydrocarbons capable of adding alkali metals. Other prior art methods using hydrogen over electron-donor-acceptor (EDA) type complexes of sodium have observed a selective hydrogenation of olefins and acetylenes. Other prior art methods have shown the selective reduction of cyclodiolefins using high temperature and pressure conditions.

The object of this invention is to provide a novel highly active hydrogenation process. It is also an object of this invention to provide a catalyst that will be useful for the hydrogenation of a wide variety of unsaturated hydrocarbons. It is also an object of this invention to provide a hydrogenation method that can be carried out at atmospheric pressure in the vapor phase using conventional equipment. It is also an object of this invention to provide a hydrogenation process wherein the alkali metal can be supported on a wide variety of anhydrous solids.

According to the invention, olefins, cycloolefins, diolefins, cyclodiolefins and acetylenes may be rapidly hydrogenated when passed with hydrogen over a catalyst comprising an alkali metal dispersed on a support, said catalyst having a surface area of at least one square meter per gram.

The unsaturated hydrocarbons should be anhydrous, and contain little or no peroxides, amines, or sulfur compounds, since the presence of water, peroxides, amines or sulfur tend to deactivate the catalyst. The hydrocarbons include normal olefins, branched olefins, cycloolefins, alkylated cycloolefins, conjugated diolefins, nonconjugated diolefins, cyclodiolefins and acetylenes.

Some representative examples of the above-mentioned unsaturated hydrocarbons useful in this invention are butene-1, butene-2, pentene-1, pentene-2, hexene-1, hexene-2-,hexene-3, isobutylene, 2-methyl butene-1, 2-methyl butene-2, 2,3-dimethyl butene-1, 2,3-dimethyl butene-2, 2,3-dimethyl pentene-1, 2,3-dimethyl pentene-2, 3,3-dimethyl butene-1, 4,4-dimethyl pentene-1, 4,4-dimethyl pentene-2, cyclopentene, cyclohexene, cycloheptene, cyclooctene, methyl-cyclopentene, methylcyclohexene, hexadiene, 2-methyl pentadiene-1,3, 1,3-butadiene, 1,2-butadiene, 1,3-piperylene, 1,4-piperylene, 1,3-hexadiene, 1,4-hexadiene, cyclohexadiene, cyclooctadiene, butyne-1, pentyne-1 and hexyne-1.

The catalysts are pure alkali metals dispersed on a variety of anhydrous supports. By the term "catalyst" is meant the total of the alkali metal plus the support. The alkali metals can be potassium, sodium, lithium, cesium, rubidium or any mixture thereof. The catalyst may contain from about 5 percent to about 50 percent by weight of the alkali metal. The preferred range is from about 10 percent to about 30 percent.

The component of the catalyst which is the support is an anhydrous support. Representative of some of the supports used in alumina, charcoal, magnesia, molecular sieves, silica-alumina and potassium carbonate. Other representative examples of supports which may be used in this invention are the hydroxides of Group I–A metals of the Periodic Chart of the elements, hydroxides of Group II–A metals of the Periodic Chart of the elements, silicates of the Group I–A metals of the Periodic Chart of the elements, silicates of the Group II–A metals of the Perodic Chart of the elements, carbonates of Group I–A metals of the Periodic Chart of the elements, carbonates of the Group II–A metals of the Periodic Chart of the elements, as well as oxides of Groups IV–B, VI–B, II–B metals of the Periodic Chart of the elements. Thus, it could be said that almost any known support can be employed.

Additives which may be added to the support to increase the selectivity to the desired product are oxides, carbonates, or silicates of Group I–A metals or Group II–A metals of the Periodic Chart of the elements. Also, oxides of Group IV–B, Group V–B, Group VI–B, Group VII–B, Group VIII–B, Group I–B or Group II–B metals.

The hydrogenation reaction used in this invention may be carried out batchwise, or continuously over a fixed or fluid bed catalyst. The rate at which the hydrocarbons are passed over the catalyst bed in a continuous hydrogenation process is usually measured in terms of liquid hourly space velocity (LHSV). The term LHSV is defined as the volume of hydrocarbon feedstock as a liquid per volume of total catalyst passed over or contacting the catalyst per hour. The hydrocarbon can be fed at LHSV of 0.5 to 10; however, the preferred range is 1 to 3.

The rate at which hydrogen is employed is measured on gaseous hourly space velocity (GHSV) and is the rate at which hydrogen gas is passed over the catalyst bed. The term GHSV is defined as the volume of hydrogen as a gas per volume of catalyst is passed over or contacting the catalyst per hour. GHSV of the hydrogen of from about 100 to about 1000 may be utilized, however, the preferred is from about 500 to about 1000.

A GHSV range of about 400 is equal to a LHSV range of about 2, if, for instance, the hydrocarbon is hexene, at standard temperature and pressure (STP=273° K., 760 mm. mercury).

In the preferred embodiment of this invention a vapor phase hydrogenation with a fixed bed catalyst is employed. Thus the amount of alkali metal employed in the catalyst is related to the rate at which the hydrocarbon to be hydrogenated is passed over or through this fixed bed catalyst. This is not to say, however, that liquid phase hydrogenation cannot be employed.

The temperature range employed in this invention is from about 80° C. to about 500° C. The preferred temperature range is from about 150° C. to about 200° C.

The pressure employed in this invention does not appear to be a critical factor as far as the rate of reaction is concerned; therefore, atmospheric pressures can be utilized. However, sub-atmospheric, i.e. 50 millimeters of mercury up to super-atmospheric, i.e. several hundred atmospheres may be employed.

What is actually required is a sufficient amount of hydrogen be present with the hydrocarbon in order to hydrogenate the hydrocarbon and not have a deficiency of available hydrogen, thus requiring many passes over the catalyst. Thus, in order to have sufficient hydrogen available, one can have a molar ratio of hydrogen/olefin from about 1 to about 2, a molar ratio of hydrogen/diolefin from about 2 to about 4, and a molar ratio of hydrogen/acetylene from about 2 to about 4. Of course, higher ratios of hydrogen to hydrocarbon may be utilized.

Since the surface area of the catalyst is where the hydrogenation reaction takes place, it is important to have a sufficient surface area in order to make the catalyst efficient. It is believed that there is an interaction of the metal with the anhydrous support, but not to the extent that the metal is deactivated with respect to the catalytic activity of hydrogenation.

To be effective in this invention, the catalyst should have a surface area of about one square meter to about 1000 square meters per gram of catalyst. A more preferable surface area would be from about 50 square meters to about 1000 square meters per gram of catalyst. The most preferred surface area would be from about 200 square meters to about 1000 square meters per gram of catalyst.

Although the catalyst system employed in this invention will hydrogenate a variety of hydrocarbons, certain ones tend to deactivate the catalytic reaction. For instance, cyclopentadiene, although it undergoes hydrogenation with this system, tends to lay down on the surface of any deactivation of the catalyst. In fact, the catalyst surface unavailable for the hydrogenation reaction. However, with the olefins such as hexene-1, there was no sign of any deactivation of the catalyst. In fact, the catalyst is so active that residence time of only a few seconds is required for some of the olefins. Residence time is the time a molecule is in the reaction zone for hydrogenation. The monoolefins tend to show a much greater advantage for hydrogenation by using the process employed in this invention than anything demonstrated in the prior art.

EXAMPLE I

The support, charcoal, was heated at 400° C. for one hour under reduced pressure (1 millimeter mercury) then cooled to 250° C. while nitrogen was admitted. Potassium, 30 percent by weight of the total catalyst, was added at 250° C. under a nitrogen atmosphere. The mixture was stirred occasionally over a one-hour period, then cooled to 200° C., at which time 300 pounds per square inch gauge of hydrogen was admitted and maintained for an additional hour. The catalyst was cooled to room temperature, the hydrogen pressure released, and the catalyst transferred to the tubular reactor under a nitrogen atmosphere.

Dried hexene-1 was hydrogenated employing 1.5 milliliters of the above catalyst which had a surface area of at least one square meter per gram by simultaneously passing hydrogen and hexene-1 at 200° C. over the catalyst. The average GHSV for hydrogen was 570 and the average LHSV for hexene-1 was 2. The hydrogenation was conducted over a two-hour period. The hydrocarbon product was collected in a cooled receiver and analyzed by gas chromatography.

Table 1 lists the hexene-1 hydrogenation along with other hydrocarbons which were hydrogenated using the same procedure and catalyst:

TABLE 1

| Compound | Temp., °C. | Conversion to— Olefin, percent | Conversion to— Saturate, percent |
|---|---|---|---|
| Butene-1 | 150 | | 65 |
| Do | 200 | | 90 |
| Hexene-1 | 150 | | 65 |
| Do | 200 | | 90 |
| Hexene-3 | 150 | | 30 |
| Do | 200 | | 68 |
| 4-methyl pentene-2 | 150 | | 50 |
| Do | 200 | | 90 |
| 3,3-dimethyl butene-1 | 150 | | 45 |
| Do | 200 | | 64 |
| Cyclopentene | 200 | | 10 |
| Methyl cyclopentene | 150 | | 10 |
| Do | 200 | | 30 |
| Cyclohexene | 150 | | 90 |
| Methyl cyclohexene | 150 | | 21 |
| Do | 200 | | 59 |
| Cyclooctene | 150 | | 25 |
| Butadiene | 150 | 46 | 53 |
| Piperylene | 150 | 78 | 9 |
| Isoprene | 150 | 20 | 1 |
| 1,5-hexadiene | 200 | 5 | 7 |
| 2-methyl-1,3-pentadiene | 150 | 85 | 9 |
| Cyclooctadiene | 150 | 42 | 19 |
| Methylacetylene | 150 | 10 | 0 |
| Pentyne-2 | 150 | 14 | 12 |

EXAMPLE II

In this example, the procedure for making the catalyst and the hydrogenation technique was the same as in Example I except that hexene-1 was the only hydrocarbon utilized with various catalysts at 200° C., mole ratio of hydrogen/hexene-1 of 2 and residence time of 1.5 seconds, where residence time is the time a molecule is in the reaction zone.

TABLE 2

| Catalyst | Percent alkali metal in catalyst | Percent saturate |
|---|---|---|
| K-charcoal | 30 | 98 |
| K-Al$_2$O$_3$ | 10 | 98 |
| K-heavy MgO | 30 | 75 |
| K-light MgO | 30 | 27 |
| K-mol sieves, 3A | 30 | 36 |
| K-mol sieves, 5A | 30 | 40 |
| K-mol sieves, 10X | 30 | 75 |
| K-mol sieves, 13X | 30 | 27 |
| K-SiO$_2$-Al$_2$O$_3$ | 30 | 2 |
| Na-Al$_2$O$_3$ | 10 | 93 |
| Na-charcoal | 30 | 50 |

Each of the catalysts in the experiments above have a surface area of at least one square meter per gram.

While certain representative embodiments and details have been shown for the purpose of illustrating the invention, it will be apparent to those skilled in this art that various changes and modifications may be made therein without departing from the spirit or scope of the invention.

What is claimed is:

1. A hydrogenation process in which monoolefins, cycloolefins, diolefins, cyclodiolefins and acetylenes are hydrogenated when passed with hydrogen over a catalyst consisting of an alkali metal dispersed on an anhydrous support, said catalyst having a surface area of at least one square meter per gram at temperatures ranging from about 80° C. to about 500° C.

2. A process according to claim 1 in which the alkali metal is at least one member selected from the group consisting of potassium, sodium, lithium, cesium and rubidium.

3. A process according to claim 1, the surface area of the anhydrous support ranges from about one square meter to about 1000 square meters per gram.

4. A process according to claim 1 in which the amount of alkali metal varies from about 5 percent to about 50 percent by weight of the entire catalyst.

5. A process according to claim 1 in which the LHSV for the hydrocarbon ranges between about 2 and about 7.

6. A process according to claim 3 in which the surface area of the anhydrous support ranges from about 200 square meters to about 1000 square meters per gram.

7. A process according to claim 2 in which the alkali metal is at least one member selected from the group consisting of potassium and sodium.

8. A process according to claim 1 in which the hydrocarbons are monoolefins.

References Cited
UNITED STATES PATENTS

| | | | |
|---|---|---|---|
| 3,470,085 | 9/1969 | Parker | 208—143 |
| 3,494,857 | 2/1970 | McIlvried et al. | 208—143 |
| 3,160,580 | 12/1964 | Achenbach et al. | 260—674 H |
| 3,682,823 | 8/1972 | Smith et al. | 260—683.9 |
| 3,621,073 | 11/1971 | McGrath et al. | 260—677 H |

CURTIS R. DAVIS, Primary Examiner

U.S. Cl. X.R.

208—143; 260—667, 677 H

PO-1050 (5/69)

UNITED STATES PATENT OFFICE
CERTIFICATE OF CORRECTION

Patent No. 3,751,515  Dated August 7, 1973

Inventor(s) Mario D. Zadra

It is certified that error appears in the above-identified patent and that said Letters Patent are hereby corrected as shown below:

Column 3, line 42, delete "of any deactivation";

Column 3, line 42, delete ". In fact," and replace with -- , thus rendering that portion of --

Signed and sealed this 5th day of February 1974.

(SEAL)
Attest:

EDWARD M. FLETCHER, JR.　　　　　　RENE D. TEGTMEYER
Attesting Officer　　　　　　　　　Acting Commissioner of Patents